United States Patent
Alary et al.

(10) Patent No.: US 9,840,650 B2
(45) Date of Patent: Dec. 12, 2017

(54) ABRASIVE GRAINS ON BASIS OF EUTECTIC ALUMINA ZIRCONIA

(71) Applicant: CENTER FOR ABRASIVES AND REFRACTORIES RESEARCH & DEVELOPMENT C.A.R.R.D. GmbH, Villach (AT)

(72) Inventors: Jean-Andre Alary, L'Isle sur la Sorgue (FR); Franz Skale, Villach (AT)

(73) Assignee: Center for Abrasives and Refractories Research & Development C.A.R.R.D. GmbH, Villach (AT)

( * ) Notice: Subject to any disclaimer, the term of this patent is extended or adjusted under 35 U.S.C. 154(b) by 176 days.

(21) Appl. No.: 14/898,523

(22) PCT Filed: Jun. 13, 2014

(86) PCT No.: PCT/EP2014/062376
§ 371 (c)(1),
(2) Date: Dec. 15, 2015

(87) PCT Pub. No.: WO2014/202479
PCT Pub. Date: Dec. 24, 2014

(65) Prior Publication Data
US 2016/0130486 A1    May 12, 2016

(30) Foreign Application Priority Data
Jun. 19, 2013 (DE) .......... 10 2013 106 372

(51) Int. Cl.
*B24D 3/02* (2006.01)
*C09C 1/68* (2006.01)
*C09K 3/14* (2006.01)

(52) U.S. Cl.
CPC .......... *C09K 3/1427* (2013.01); *C09K 3/1436* (2013.01)

(58) Field of Classification Search
None
See application file for complete search history.

(56) References Cited

U.S. PATENT DOCUMENTS 3,891,408 A    6/1975  Rowse et al.
4,157,898 A    6/1979  Walker et al.
(Continued)

FOREIGN PATENT DOCUMENTS

CN    101001817 A    7/2007
CN    102892856 A    1/2013
(Continued)

*Primary Examiner* — Kaj K Olsen
*Assistant Examiner* — Ross J Christie
(74) *Attorney, Agent, or Firm* — Finnegan, Henderson, Farabow, Garrett & Dunner LLP

(57) ABSTRACT

Heat treated alumina zirconia abrasive grains based on $Al_2O_3$ and $ZrO_2$ may be fused in an electric arc furnace, and may have a weight content of: $Al_2O_3$ between 52% and 62% by weight; $ZrO_2$ and $HfO_2$ between 35% and 45% by weight, with at least 6% by weight based on the total weight content of $ZrO_2$ being present in the tetragonal and/or cubic high temperature modifications of $ZrO_2$; Si-compounds between 0.2% and 0.7% by weight expressed as $SiO_2$; carbon between 0.03% and 0.5% by weight; additives between 0.5% and 10% by weight; and raw-material-based impurities of less than 3% by weight. The heat treated alumina zirconia abrasive grains may be heat treated in air between 350° C. and 700° C. for a time period of one to six hours using a rotary kiln.

9 Claims, 3 Drawing Sheets

(56) References Cited

U.S. PATENT DOCUMENTS

Figure 1:
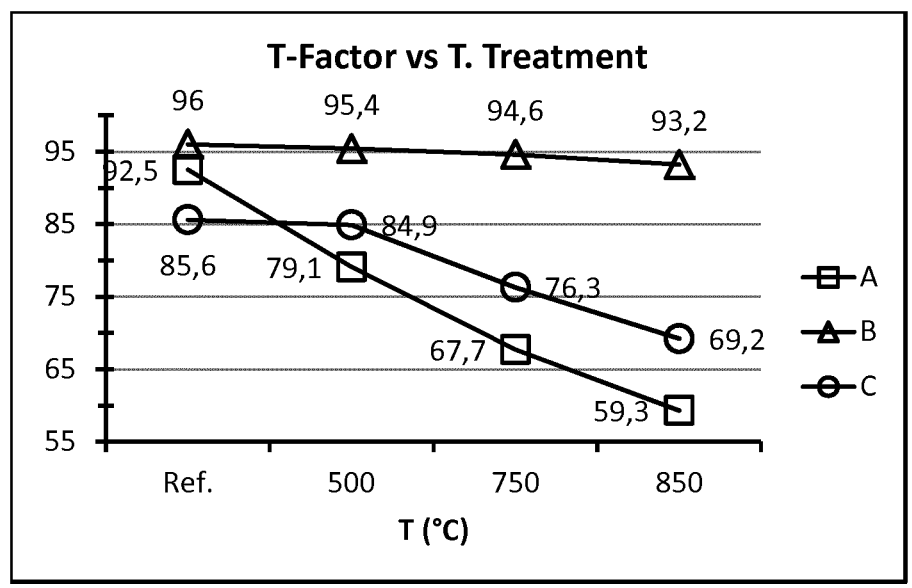

| | | | |
|---|---|---|---|
| 4,457,767 | A | 7/1984 | Poon et al. |
| 5,525,135 | A | 6/1996 | Möltgen et al. |
| 7,122,064 | B2 | 10/2006 | Dazza et al. |
| 2012/0186161 | A1 | 7/2012 | Marlin et al. |
| 2013/0067828 | A1 | 3/2013 | Knuth |

FOREIGN PATENT DOCUMENTS

| | | |
|---|---|---|
| EP | 0 480 678 A2 | 4/1992 |
| EP | 0 593 977 A1 | 4/1994 |
| EP | 1 339 809 | 9/2003 |
| WO | WO 02/46327 A1 | 6/2002 |
| WO | WO 2011/141037 A1 | 11/2011 |

US 9,840,650 B2

ABRASIVE GRAINS ON BASIS OF EUTECTIC ALUMINA ZIRCONIA

CLAIM FOR PRIORITY

This application is a U.S. national phase entry under 35 U.S.C. §371 from PCT International Application No. PCT/EP2014/062376, filed Jun. 13, 2014, which claims the benefit of priority of German Patent Application No. 10 2013 106 372.1, filed Jun. 19, 2013, the subject matter of both of which is incorporated herein by reference.

TECHNICAL FIELD

The present invention relates to abrasive grains based on $Al_2O_3$ and $ZrO_2$ fused in an electric arc furnace having a weight content of $Al_2O_3$ between 52% by weight and 62% by weight and a weight content of $ZrO_2$ between 35% by weight and 50% by weight, with at least 60% by weight of the $ZrO_2$, based on the total weight content of $ZrO_2$, being present in the tetragonal and/or cubic high-temperature modification.

Abrasive grains based on alumina zirconia have been known for many years and are successfully used in bonded or coated abrasives, particularly for machining high-alloy steels. Thereby, it has been shown that beside the microcrystalline structure, in particular high weight contents of high-temperature modifications have an advantageous effect on the performance of the abrasive grains. This is particularly effective in the case of eutectic alumina zirconia comprising preferably 35% to 50% by weight zirconium oxide beside aluminum oxide and other oxides being present as contaminations or well-directed additives. Therefore, in the past, every endeavor has been made to improve the performance of alumina zirconia by refining the microstructure and/or increasing the weight content of the high-temperature modifications. Whereas the microstructure is improved by rapid quenching of the liquid melt, high amounts of high-temperature modifications are preferably obtained by specific use of stabilizers, in doing so titanium oxide and/or yttrium oxide are often used as stabilizers.

Zirconium oxide is to be found in three different modifications. The monoclinic modification being stable at room temperature transforms at temperatures between about 800° C. and 1200° C. into the tetragonal modification which is stable up to about 2300° C. and subsequently transforms into the cubic modification. The above mentioned temperatures apply for pure zirconium oxide. The temperatures are switched in case of mixtures or doped materials. The reversible phase transitions are accompanied by volume changes, whereby the tetragonal high temperature modification shows the lowest volume. The transition from tetragonal modification to monoclinic modification, which has the highest volume, is accompanied by a volume increase of 4.5%. A person skilled in the art interprets the positive impact of the high-temperature modification in that a phase transition from tetragonal to monoclinic takes place because of the generation of heat during the grinding process, whereby the increase of volume induces tensions and micro breaks bringing forward the breaking off of small areas, whereby new cutting edges are formed. This process is also often called self-sharpening.

In U.S. Pat. No. 5,525,135 (EP 0 595 081 B1), an abrasive grain based on alumina zirconia is described in which more than 90% by weight of the zirconium oxide are present in the tetragonal high-temperature modification. In this case the stabilization of the high-temperature phase takes place by adding titanium oxide in the presence of carbon as reducing agent and then rapidly quenching the melt. It is assumed that the resulting reduced titanium compounds in the form of suboxides effect the stabilization of the high-temperature phase of zirconium oxide.

In U.S. Pat. No. 7,122,064 B2 (EP 1 341 866 B1), abrasive grains based on alumina zirconia are described in which the high-temperature phases of zirconium oxide are likewise stabilized with titanium compounds in reduced form. The abrasive grains described in this document additionally contain silicon compounds at a content of between 0.2% and 0.7% by weight, expressed as $SiO_2$. Although the stabilizing effect of the reduced titanium compound is significantly reduced by addition of $SiO_2$, the viscosity of the melt is also greatly reduced at the same time, thus facilitating the quenching of the melt, in the process of which the liquid material is poured between metal plates. The rapid quenching has a positive effect on the structure of the finished abrasive grain, so that in this way a particularly fine crystalline and homogeneous structure can be achieved which, beside high weight content of high-temperature modifications of zirconium oxide, is another important criterion for the product quality.

In U.S. Pat. No. 4,457,767, an alumina zirconia abrasive grain is described that contains between 0.1% and 2% by weight yttrium oxide, which is known as a stabilizer for the high-temperature modifications of zirconium oxide. It is known that the stabilizing effect of $Y_2O_3$ for the high-temperature phases of zirconium oxide is more pronounced than that of reduced. $TiO_2$, and therefore, comparatively less $Y_2O_3$ needs to be used in order to obtain comparable weight contents of the high-temperature phases.

Today, abrasive grains based on alumina zirconia are still among the most important conventional abrasive grains for machining a large variety of different steels, and great efforts are therefore being made worldwide to improve the performance of the abrasive grains. A further increase of the amount of high-temperature modifications alone does not seem to effect an adequate performance enhancement. Thus, in WO 2011/141037 A1, grinding tests of alumina zirconia abrasive grains are described, which grains partially comprise solely high-temperature modifications of zirconium oxide, whereas in comparison with abrasive grains comprising only about 90% by weight high-temperature modifications of zirconium oxide, based on the total weight of zirconium oxide, no improved grinding performance is to be recognized. However, in WO 2011/141037, for the first time it is consequently differentiated between the tetragonal and the cubic high-temperature phase, whereby an optimization of the grinding performance is described in the case that more than 20% by weight of the zirconium oxide are present in the cubic high-temperature phase and more than 50% by weight of the zirconium oxide are present in the tetragonal high-temperature phase, each based on the total weight of the zirconium oxide, which can be achieved by a combined use of $Y_2O_3$ and $TiO_2$ as stabilizers in the presence of low amounts of $SiO_2$ as fluxing agent.

The influence of the different modifications of zirconium oxide on the field of application of eutectic alumina zirconia is also subject-matter of EP 0 480 678 A2. The above mentioned European patent application describes the production of a lapping abrasive in the system aluminum oxide zirconium oxide. Firstly, a eutectic alumina zirconia having a high weight content of tetragonal zirconium oxide phase is produced in a conventional manner. Subsequently, the tetragonal phase is converted into the monoclinic phase by thermal treatment at a temperature of about 650° C. in order to obtain an abrasive powder having less than 30% by weight tetragonal phase, based on the total weight content of zirconium oxide. Because of the phase transition and the induced formation of cracks in alumina zirconia a "weak" abrasive grain is obtained having a low strength and being suitable as lapping agent for developing homogeneous surfaces without scratches.

U.S. Pat. No. 2012/0186161 A1 describes an abrasive grain on basis of fused alumina zirconia having a weight content of tetragonal phase of zirconium oxide of 60% by weight to 90% by weight, based on the total weight content of zirconium oxide. The phase distribution with relatively low amounts of tetragonal phase is obtained by a specific chemical composition using yttrium oxide and titanium oxide as stabilizers for the high-temperature phase in the presence of $SiO_2$ with a ratio of $Y_2O_3/SiO_2$ of between 0.8 and 2.0. Because of its low toughness the product is considered to be advantageously suitable for machining alloyed steels at low grinding pressure. The self-sharpening of the abrasive grain takes place at relatively smooth conditions, thus, it is possible to avoid thermally damaging of the workpiece, whereas high grinding performances are realized.

In EP 1 339 809 B1, a method is described for enhancing the grain toughness of corundum abrasive grains on basis of alumina by thermal treatment at temperatures of between 800° C. and 1500° C.

The production of titanium containing high-strength corundum by thermal treatment is described in U.S. Pat. No. 4,157,898.

Due to the above mentioned phase transitions, it has been previously attempted to avoid any impact of temperature to finished alumina zirconia abrasive grains as far as possible, because there was the fear and the experience that the abrasive grain would be destroyed, thus, except for the lapping agent described in EP 0 408 678, for which the destruction of the abrasive grain has been consciously accepted, a thermal treatment of alumina zirconia is not known.

For evaluating the quality of abrasive grains, it is necessary to make grinding tests which are relatively complex and time-consuming. Therefore, it is common practice in the abrasive business to evaluate the quality of abrasive grains in advance by means of mechanical properties which are easier accessible and which provide indications for the later performance in grinding test. Thus, beside the aforementioned microstructure and the contents of high-temperature modifications, in particular the grain fracture strength (CFF) according to Vollstaedt and the micro grit decomposition (MKZ) by milling in a ball mill are often used for quality control of abrasive grains.

Grain Fracture Strength (CFF-Value)

The measurement of the grain fracture strength is carried out with a test apparatus which was developed for firmness tests for diamonds (Vollstaedt, Diatest SI). With this method, the abrasive grain is broken in a piston cell and the maximum force (compressive fracture force=CFF) at which the grain is broken into pieces is recorded. For this purpose, the pressure sensor is adapted for a measurement range from 0 to 200 Newton. For preparing the samples, a fraction, in the range between 600 µm and 500 µm (=30 mesh to 35 mesh) is screened out, which were then further sorted relative to their grain size via a vibrating table. From the obtained measurement fractions, 200 to 220 single measurements were each carried out, so that statistically sufficiently certain values for the average grain strength are obtained.

Micro Grit Decomposition
(MKZ=Mikrokornzerfall)

For measurement of the micro grit decomposition 10 g corundum (grit size P36) are milled for a definite time period in a ball mill filled with 12 steel balls (diameter 15 mm, weight 330-332 g) using 188 rotations per minute. Subsequently, the milled grit is screened in a sieving machine (Haver Bocker EML 200) for 5 minutes using a 250 µm sieve and then the fine fraction is weighted.

The MKZ-value results from:

$$MKZ\ (\%) = \frac{\text{screen underflow 250 µm}}{\text{initial total weight}} \times 100$$

Furthermore, in the present case, the weight content of high-temperature modifications was determined as another criterion for product quality, but in doing so it was not differentiated between the tetragonal and cubic phases, and a so called T-factor incorporating both phases was determined.

T-Factor

The quantitative measurement of the weight content of high-temperature modifications of $ZrO_2$, based on the total weight content of $ZrO_2$, is carried out by means of an X-ray diffractometer using a measuring range 2-Θ between 27.5° and 32.5°. The weight contents of high-temperature phases (T-factor) are determined according to the equation $$T\text{-factor}\ (\%) = \frac{2t \times 100}{2t + m1 + m2}.$$

t=intensity of tetragonal peak at 2-Θ=30.3°
m1=intensity of monoclinic peak at 2-Θ=28.3°
m2=intensity of monoclinic Peak at 2-Θ=31.5°

Confronted with the problem of further developing alumina zirconia and improving the product quality, it was surprisingly found out, within the scope of appropriate test series for optimizing alumina zirconia for specific applications, that a thermal treatment of alumina zirconia abrasive grains at temperatures between 350° C. and 700° C. in air effect an increasing grinding performance of said abrasive grains, even though the weight content of high-temperature phases is reduced.

In this way, fused abrasive grains are obtained having a weight content of $ZrO_2$ and $HfO_2$ between 35% and 45% by weight, with at least 60% by weight of zirconium oxide, based on the total weight of zirconium oxide, being present in the tetragonal and/or cubic crystal form. Besides that, the abrasive grains have a weight content of Si-compounds, expressed as $SiO_2$, between 0.2% and 0.7% by weight, a weight content of carbon between 0.03% and 0.5% by weight, a weight content of additives between 0.5% and 10.0% by weight and less than 3% by weight impurities, the difference to 100% by weight is balanced by $Al_2O_3$ having a weight content of 52% by weight to 62% by weight.

The additives are selected from the group consisting of reduced Ti-compounds, $Y_2O_3$, MgO, CaO and/or mixtures thereof.

After quenching the melt, crushing the solidified fused product and screening it, the screened grit sizes are subjected to a heat treatment in air at temperatures between 350° C. and 700° C. for a time period of 1 to 6 hours. The temperature treatment is preferably carried out in a rotary kiln.

The improvement of the mechanical characteristics of alumina zirconia abrasive grains is significantly pronounced within abrasive grains comprising reduced titanium compounds for stabilization of high-temperature phases of zirconium oxide. Particularly, in the case that the stabilization is solely realized with titanium compounds, the grain fracture strength (CFF) according to Vollstaedt is increased by a thermal after-treatment, while the micro grit decomposition (MKZ) is reduced, whereby the abrasive grains preferably have an improved grain fracture strength (CFF) according to Vollstaedt of at least 90 N and a reduced micro grit decomposition of less than 7%. Particularly preferred, the grain fracture strength (CFF) according to Vollstaedt is at least 95 N and the micro grit decomposition is less than 6%. At the same time, the weight content of the tetragonal and/or cubic phases of zirconium oxide is preferably reduced to an amount of 60% to 80% per weight, based on the total weight content of zirconium oxide.

In the following, the present invention is explained by means of examples without indicating any limitations.

The samples were produced on conventional way by fusing a mixture of alumina, baddeleyite concentrate, zircon sand, petroleum coke and additional rutile sand and/or $Y_2O_3$ as stabilizers in an electric arc furnace. After melting of the entire raw material mixture, the melt was poured into a gap of approximately 3 to 5 mm between metal plates, according to EP 0 593 977. The so-quenched alumina zirconia plates, after having cooled down completely, were crushed to small pieces in the usual manner by jaw crushers, roller crushers, roller mills or cone crushers and screened to the desired grain size fraction.

Three samples with different additives (stabilizers) were chosen. The samples characterized below as sample A, B, and C are summarized in table 1 with their typical chemical composition and their weight contents of high-temperature phases of zirconium oxide.

Firstly, the T-factors, CFF-values, and MKZ-values of the untreated alumina zirconia summarized in the below table 1 were determined (RT=room temperature). Subsequently, the samples were subjected to a heat treatment at 500° C., 750° C., and 850° C. in air for a time period of 2 hours in a rotary kiln. From each of the so treated samples, again the T-factors, CFF-values, and MKZ-values were determined.

TABLE 1

| sample | | A | B | C |
|---|---|---|---|---|
| chemical | $Al_2O_3$ | 55 | 56.2 | 54 |
| composition (%) | $ZrO_2 + HfO_2$ | 41 | 42 | 43.5 |
| | $TiO_2$ | 3.25 | — | 1.4 |
| | $SiO_2$ | 0.3 | 0.6 | 0.4 |
| | $Y_2O_3$ | — | 1.7 | 0.6 |
| $ZrO_2$ phase | RT | 92.5 | 96 | 85.6 |
| distribution | 500° C. | 79.1 | 95.4 | 84.9 |
| T-factor (%) | 750° C. | 67.7 | 94.6 | 76.3 |
| | 850° C. | 59.3 | 93.2 | 69.2 |
| CFF-value (N) | RT | 93 | 91 | 97 |
| | 500° C. | 98.2 | 88 | 92 |
| | 750° C. | 94.8 | 89 | 94 |
| | 850° C. | 71.7 | 76 | 80 |
| MKZ-value (%) | RT | 7.1 | 5.7 | 4.5 |
| | 500° C. | 5.7 | 4.9 | 4.3 |

TABLE 1-continued

| sample | A | B | C |
|---|---|---|---|
| 750° C. | 7.9 | 11.5 | 6.5 |
| 850° C. | 11.7 | 20.1 | 17.2 |

Figure 2:
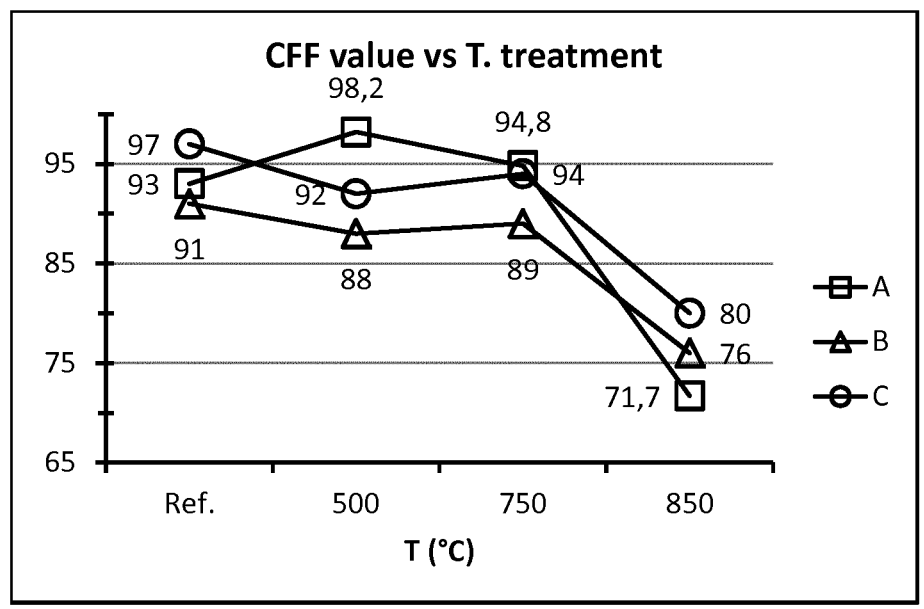
Figure 3:
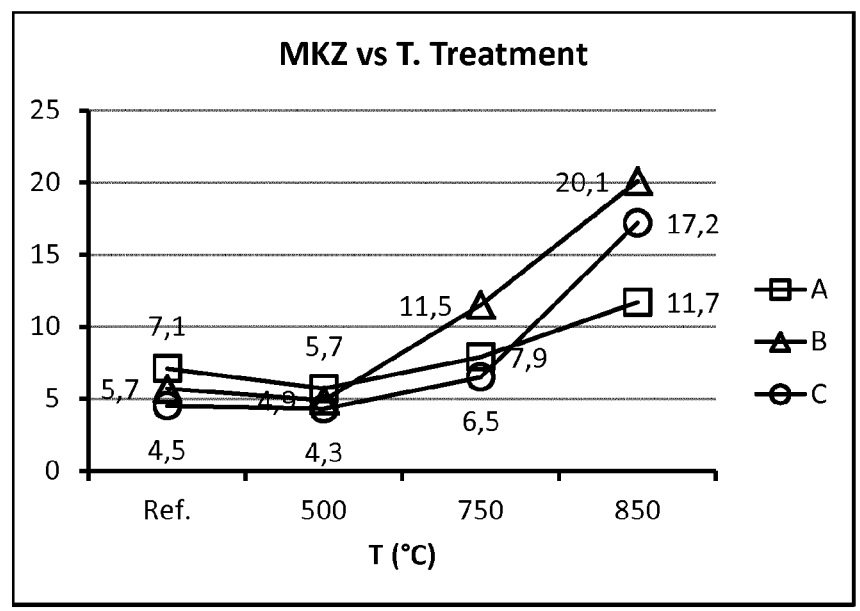
Figure 4:
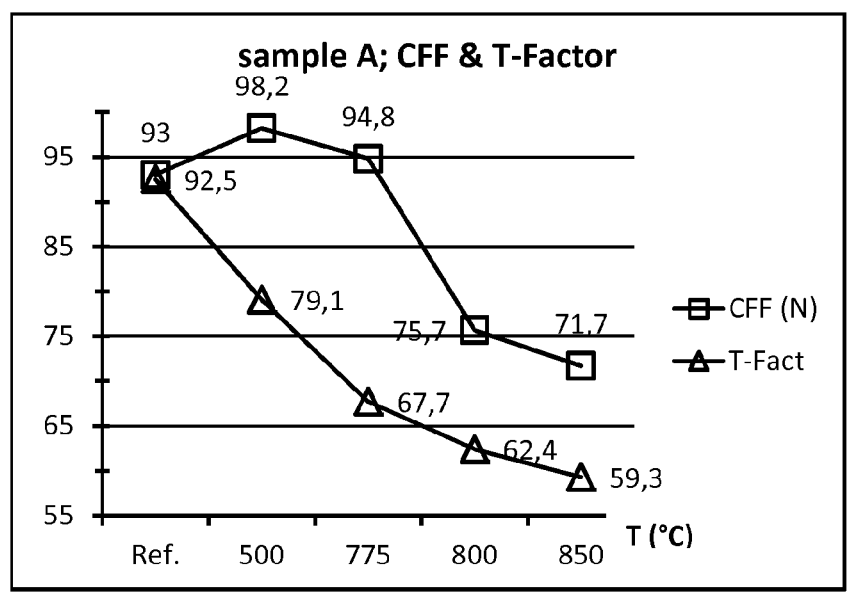
Figure 5:
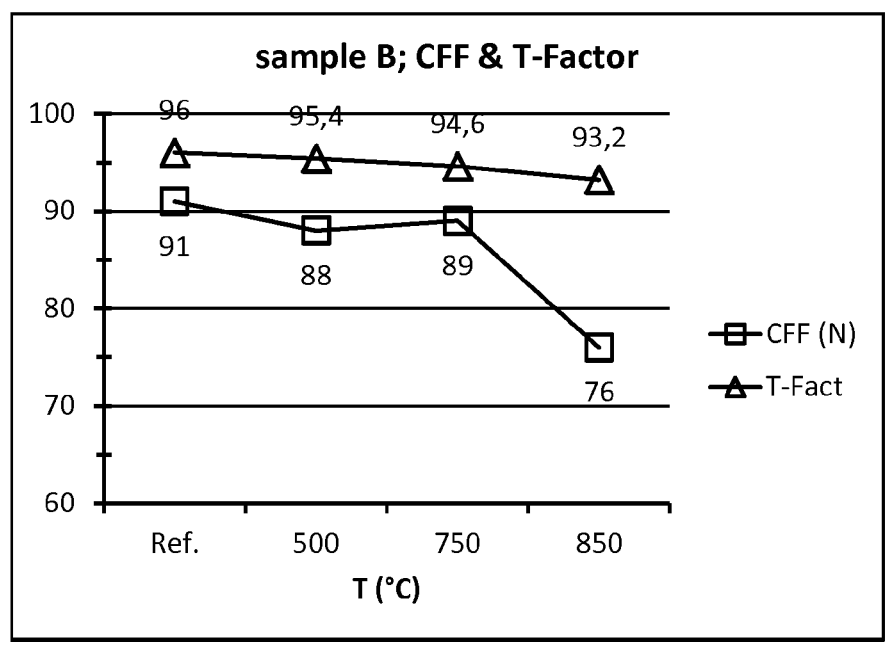
Figure 6:
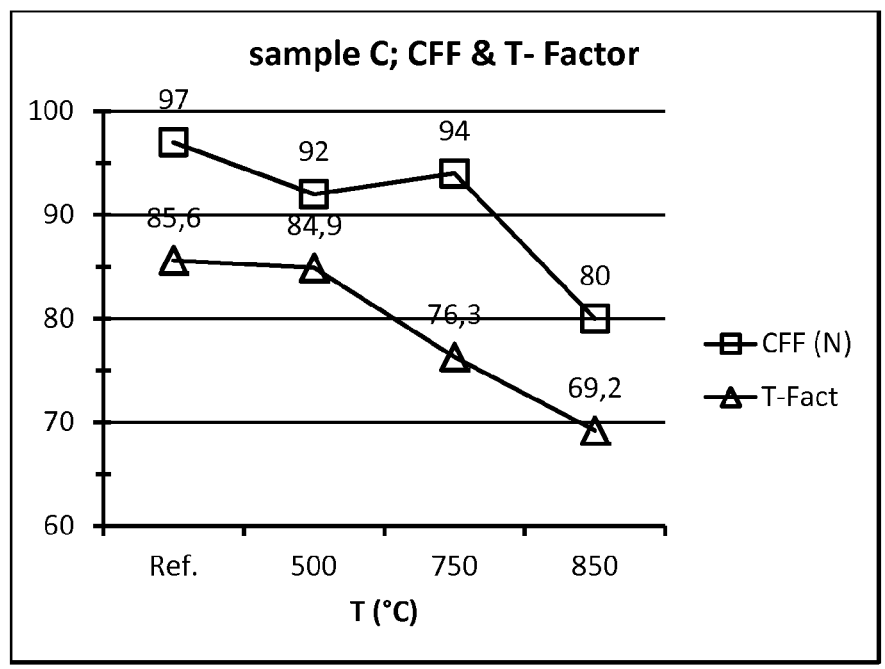

In FIGS. 1 to 6 the graphical progressions of the mechanical and crystallographic data summarized in table 1 are reproduced. Thereby demonstrate:

FIG. 1 the graphical progression of the T-factor of sample A, B, and C with increasing temperatures;

FIG. 2 the graphical progression of the CFF-value of sample A, B, and C with increasing temperatures;

FIG. 3 the graphical progression of the MKZ-value of sample A, B, and C with increasing temperatures;

FIG. 4 the influence of the temperature treatment on CFF-value and T-factor with respect to sample A;

FIG. 5 the influence of the temperature treatment on CFF-value and T-factor with respect to sample B; and FIG. 6 the influence of the temperature treatment on CFF-value and T-factor with respect to sample C.

From FIG. 1 the influence of the different stabilizers becomes apparent. Whereas sample A stabilized solely with Ti-compounds shows a continuous and significant decrease of the high-temperature phase with increasing treatment temperatures, there is, even at temperatures up to 850°, only a marginal decrease of the T-factor to be observed with respect to sample B stabilized only with $Y_2O_3$. For the mixed stabilized sample C, there is not till 500° C. then a significant decrease of the T-factor to be observed. Obviously, $Y_2O_3$ stabilizes the high-temperature phases more efficiently and more sustainably.

Nevertheless, the curves in FIG. 2 reveal that the decrease of the high-temperature phases, respectively, the phase transitions does not influence the grain fracture strength (CFF) that much, up to a temperature of 750° C. The grain fracture strength is for all 3 samples nearly unchanged up to a temperature of 750° C. Of particular interest is the increase of the grain fracture strength at 500° C. of sample A stabilized only with Ti-compounds.

The micro grit decomposition with increasing temperature illustrated in FIG. 3 shows for all 3 samples A, B, and C a similar, but variably pronounced progression. Thus, the micro grit decomposition decreases at the first temperature level up to 500° C. in order to subsequently increase different strongly with progressing temperature treatment dependent on the type of stabilization. Also in this case, it is of interest that sample A solely stabilized with titanium compounds shows the lowest increase of micro grit decomposition and consequently the lowest wear.

The FIGS. 4, 5, and 6 illustrate in each case with respect to the different samples A, B, and C the changing of the T-factor in comparison with the changing of the grain facture strength (CFF), whereby also here the significant divergence of both curves in case of sample A only stabilized with Ti-compounds attracts attention.

Additionally, grinding tests were carried out with some selected samples, in so doing a temperature treated sample was compared with the untreated original sample, respectively.

Cut-Off Wheel Test

For this series of tests, cut-off wheels of the specification R-T1 180×3×22.5 were chosen. First, a pressing mixture consisting of 75% by weight alumina zirconia of grit size P36, 5% by weight liquid resin, 12% by weight powder resin from HEXION Specialty chemicals GmbH, 4% by weight pyrite, and 4% by weight cryolite was prepared. For the production of the wheels, 160 g of the pressing mixture were molded onto a commercially available fabric material and pressed at 200 bar and cured according to the resin manufacturer's instructions.

For the cut-off test, round steel bars made of stainless steel X5CrNi18-10 (material number 1.4301) with a diameter of 20 mm were used. The cutting operations were performed at a wheel speed of 8,000 revolutions per minute and with a cutting time of 3 seconds. After 20 cuts the wheel wear was determined based on the reduction in diameter of the wheels. The G-ratio was calculated from the ratio of material removal and wheel wear. The results of the grinding tests are summarized in table 2.

TABLE 2

| sample | | G-ratio | performance (%) |
|---|---|---|---|
| A | untreated | 13.57 | 100% |
|   | 500° C. | 15.14 | 112% |
| B | untreated | 9.12 | 100% |
|   | 500° C. | 10.36 | 113% |
| C | untreated | 9.42 | 100% |
|   | 500° C. | 12.00 | 127% |

The results summarized in table 2 reveal that the grinding efficiency of all tested alumina zirconia abrasive grains is improved by a heat treatment of the finished abrasive grains. In the context of the present invention the influence of the type of stabilization was investigated and can be summarized as follows.

The particular advantage of the stabilization with reduced T-compounds firstly consists in that the so-stabilized alumina zirconia (sample A) has per se a higher performance than samples B and C which are fully or partially stabilized with $Y_2O_3$. Another advantage of the stabilization with Ti-compounds is the fact that a cheap raw material (rutile sand) can be used as stabilizing additive. Actually, the price of $Y_2O_3$ is more than hundredfold the price of rutile sand. Furthermore, contrary to the fully or partially $Y_2O_3$-stabilized samples B and C, the grain fracture strength of the Ti-stabilized sample A is enhanced with increasing temperatures. Last but not least, sample A solely stabilized with titanium compounds shows the lowest increase of micro grit decomposition and consequently the lowest wear.

The invention claimed is:

1. Abrasive grains based on $Al_2O_3$ and $ZrO_2$ fused in an electric arc furnace and having a weight content of:
   $Al_2O_3$ between 52% and 62% by weight;
   $ZrO_2$ and $HfO_2$ between 35% and 45% by weight, with at least 60% by weight, based on the total weight content of $ZrO_2$, being present in the tetragonal and/or cubic high temperature modifications of $ZrO_2$;
   Si-compounds between 0.2% and 0.7% by weight, expressed as $SiO_2$;
   carbon between 0.03% and 0.5% by weight;
   additives between 0.5% and 10% by weight; and
   raw-material-based impurities of less than 3% by weight,
   wherein the abrasive grains are characterized in that after quenching the melt, crushing the solidified fused product and screening it into grit sizes, the abrasive grains are heat treated in air between 350° C. and 700° C. for a time period of one to six hours.

2. The abrasive grains according to claim 1, characterized in that the additives are selected from the group consisting of reduced Ti-compounds, $Y_2O_3$, MgO, CaO, and/or mixtures thereof.

3. The abrasive grains according to claim 1, characterized in that the abrasive grains are heat treated in air between 400° C. and 600° C. for a time period of two to four hours.

4. The abrasive grains according to claim 1, characterized in that the additives comprise at least one reduced titanium compound in the form of oxides, suboxides, carbides, oxycarbides, oxycarbonitrides, and/or silicides.

5. The abrasive grains according to claim 1, characterized in that between 65% and 85% by weight of $ZrO_2$, based on the total weight content of $ZrO_2$, are present in the tetragonal and/or cubic high-temperature modifications.

6. The abrasive grains according to claim 1, characterized in that the abrasive grains have an improved grain fracture strength (CFF) according to Vollstaedt of at least 95 N.

7. The abrasive grains according to claim 1, characterized in that the abrasive grains have a minimized micro grit decomposition (MKZ) of less than 6%.

8. The abrasive grains according to claim 1, characterized in that the additives comprise a reduced titanium compound in the form of oxides, suboxides, carbides, oxycarbides, oxycarbonitrides, and/or silicides, whereby between 60% and 80% by weight of $ZrO_2$, based on the total weight content of $ZrO_2$, are present in the tetragonal and/or cubic high-temperature modifications, and whereby the abrasive grains have an improved grain fracture strength (CFF) according to Vollstaedt of at least 95 N.

9. A method for producing fused abrasive grains according to claim 1, the method comprising:
   mixing raw materials to produce abrasive grains having the following chemical composition:
   a) $Al_2O_3$ between 52% and 62% by weight;
   b) $ZrO_2$ and $HfO_2$ between 35% and 45% by weight, with at least 60% by weight of $ZrO_2$, based on the total weight content of $ZrO_2$, being present in tetragonal and/or cubic high-temperature modification;
   c) Si-compounds between 0.2% and 0.7% by weight expressed as $SiO_2$;
   d) carbon between 0.03% and 0.5% by weight;
   e) additives between 0.5% and 10% by weight; and
   f) raw-material-based impurities of less than 3% by weight;
   fusing the mixture in an electric arc furnace;
   quenching the fused mixture to obtain a solidified product;
   crushing the solidified product and subsequently screening the crushed solidified product to obtain abrasive grains; and
   heat treating the abrasive grains at a temperature between 350° C. and 700° C. in air for a time period of one to six hours.

* * * * *